(12) United States Patent
Abe et al.

(10) Patent No.: US 9,525,206 B2
(45) Date of Patent: Dec. 20, 2016

(54) ANTENNA UNIT, RADAR DEVICE, AND COMPOSITE SENSOR DEVICE

(71) Applicant: Honda elesys Co., Ltd., Yokohama-shi, Kanagawa-ken (JP)

(72) Inventors: Akira Abe, Yokohama (JP); Takayuki Kobayashi, Yokohama (JP)

(73) Assignee: Honda elesys Co., Ltd., Kanagawa (JP)

(*) Notice: Subject to any disclaimer, the term of this patent is extended or adjusted under 35 U.S.C. 154(b) by 358 days.

(21) Appl. No.: 14/179,910

(22) Filed: Feb. 13, 2014

(65) Prior Publication Data

US 2015/0229023 A1 Aug. 13, 2015

(51) Int. Cl.
| | |
|---|---|
| *H01Q 3/34* | (2006.01) |
| *G01S 13/86* | (2006.01) |
| *H01Q 5/22* | (2015.01) |
| *H01Q 13/02* | (2006.01) |
| *G01S 13/93* | (2006.01) |
| *H01Q 3/00* | (2006.01) |
| *G01S 13/00* | (2006.01) |
| *H01Q 5/00* | (2015.01) |
| *G01S 7/03* | (2006.01) |

(52) U.S. Cl.
CPC ............. *H01Q 3/34* (2013.01); *G01S 13/931* (2013.01); *H01Q 5/22* (2015.01); *H01Q 13/02* (2013.01); *G01S 7/03* (2013.01); *G01S 13/867* (2013.01); *G01S 2013/9392* (2013.01)

(58) Field of Classification Search
CPC ............. H01Q 3/26; H01Q 3/30; H01Q 3/34; H01Q 13/02; H01Q 5/20; H01Q 5/22; G01S 7/02; G01S 7/03; G01S 13/86; G01S 13/867; G01S 13/88; G01S 13/93; G01S 13/931; G01S 2013/9371; G01S 2013/9392

See application file for complete search history.

(56) References Cited

U.S. PATENT DOCUMENTS

| | | | | |
|---|---|---|---|---|
| 2,398,095 | A * | 4/1946 | Katzin | H01Q 13/02 |
| | | | | 343/756 |
| 3,794,997 | A * | 2/1974 | Iwatsuki | G01S 13/931 |
| | | | | 180/169 |
| 4,308,536 | A * | 12/1981 | Sims, Jr. | G01S 13/931 |
| | | | | 342/109 |
| 5,045,856 | A * | 9/1991 | Paoletti | G01S 13/931 |
| | | | | 340/904 |

(Continued)

FOREIGN PATENT DOCUMENTS

WO 2006/035510 4/2006

OTHER PUBLICATIONS

Millimeter-wave Microstrip Array Antenna for Automotive Radar System, Toshiaki Watanabe et al., Toyota Central Research and Development Laboratories, Inc. (Discussed in specification).

*Primary Examiner* — Bernarr Gregory
(74) *Attorney, Agent, or Firm* — Keating & Bennett, LLP

(57) ABSTRACT

A DBF antenna unit including one or more transmitting antennas and a plurality of receiving antennas arranged at a predetermined interval in a horizontal scanning direction. Each of the transmitting antennas and the receiving antennas includes a waveguide provided with a corner bend and a horn expanding in a pyramid-like shape from one end of the waveguide. The other ends of the waveguides of all the transmitting antennas and the receiving antennas are placed on the same plane.

20 Claims, 8 Drawing Sheets

(56) References Cited

U.S. PATENT DOCUMENTS

| | | | |
|---|---|---|---|
| 6,043,772 A * | 3/2000 | Voigtlaender | G01S 13/931 342/175 |
| 6,275,180 B1 * | 8/2001 | Dean | G01S 13/931 342/128 |
| 2013/0033404 A1 | 2/2013 | Abe | |

* cited by examiner

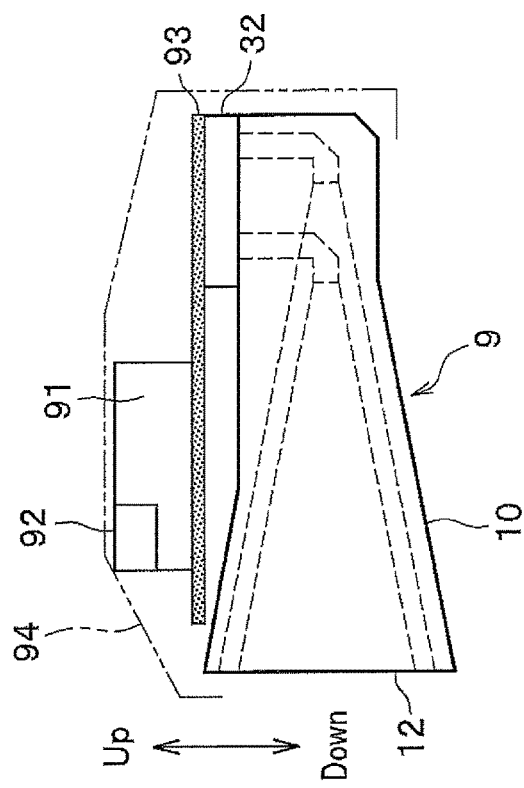
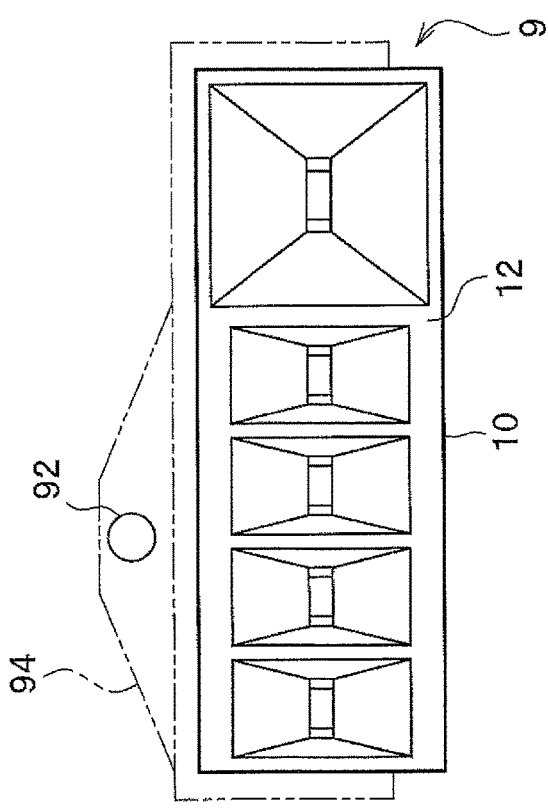
FIG. 9A
FIG. 9B

ANTENNA UNIT, RADAR DEVICE, AND COMPOSITE SENSOR DEVICE

BACKGROUND OF THE INVENTION

Field of the Invention

The present invention relates to an antenna unit, a radar system, and a composite sensor device, for monitoring a traveling direction of a vehicle, and is particularly suitable for an antenna unit, a radar device, or a composite sensor device, that uses millimeter-wave radar and is mounted in a passenger compartment.

Description of Related Art

A radar device mounted in a vehicle is used to enhance the safety in traveling of the vehicle (for example, automobile). In particular, it is well known that a vehicle-mounted radar device using the millimeter-wave radar has been highly improved in its function and performance. Hereinafter, the vehicle-mounted radar device using the millimeter-wave radar is referred to as a millimeter-wave radar device in some descriptions.

Conventionally, the typical millimeter-wave radar device is mounted in front of the engine compartment of an automobile. Therefore, when the depth is assumed in the direction perpendicular to the radar aperture plane, the millimeter-wave radar device having the depth length as short as possible is preferable. To meet this requirement, the DBF (Digital Beam Forming) architecture is often employed in the millimeter-wave radar device. The DBF architecture satisfies this requirement, because the DBF architecture can perform scanning at high speed and high precision without a drive for a rotation.

In order to meet the above requirement, the millimeter-wave radar device is also formed in a thin structure and shape by overlapping and bonding a flat plate type of antenna on an electrical substrate. Among those flat plate types of antennas, an antenna of slotted waveguide array architecture has features such as low loss, high gain, and almost no performance variations caused by heat (for example, refer to Japan laid-open patent application No. 2013-032979A, hereinafter refer to as "Patent Document 1").

Other than the above antenna type, a printed antenna is sometimes used for a thinner type, but practically lower in efficiency than the waveguide slot array architecture due to a large loss in a conductive line (for example, refer to "Millimeter-wave microstrip array antenna for automotive radar systems by Toshiaki Watanabe and three others, IEICE General Conference 2000, B-1-135, p. 135; hereinafter refer to as "Non-Patent Document 1").

In other aspects, the millimeter-wave radar has been advanced in various technical developments for the purpose of further spread thereof. For example, consideration has been started of mounting the millimeter-wave radar device in a passenger compartment. For a device mounted in the passenger compartment, for example, the International Patent Publication No. WO2006/035510 proposes a structure shown in FIGS. 9 and 10 thereof. This increases the possibility to mount the millimeter-wave radar device even in a car such as a compact car having little space for mounting a radar device in the front of the engine compartment, (i.e., increasing in the number of models accommodating the millimeter-wave radar device).

Further, when the millimeter-wave radar device is mounted in the front of the engine compartment, the vehicle needs to be provided with a protective cover that transmits radio waves, and the millimeter-wave radar device also needs to be structured to be airtight by a device housing and a radome in order to protect the millimeter-wave radar device. On the other hand, when the millimeter-wave radar device is mounted in the passenger compartment, the protective cover, the airtight structure of the millimeter-wave radar device, and the radome is unnecessary. Therefore, it results in the effectiveness which can reduce the cost of the millimeter-wave radar device (i.e., reduction in price).

As the location for mounting the millimeter-wave radar device in the passenger compartment, it is considered appropriate to accommodate the millimeter-wave radar device in a gap between the windshield and the rearview mirror so as not to obstruct the driver's view. This space is also advantageous because the depth of the space is relatively large enough to accommodate the millimeter-wave radar device by placing the substrate approximately horizontally. However, the height of the millimeter-wave radar device is limited to a range of the height in which the millimeter-wave radar device is concealed in the vertical direction of the rearview mirror because of the above reasons.

SUMMARY OF THE INVENTION

The millimeter-wave radar device of DBF architecture, however, is large in size compared to radars such as a laser-radar or a short-range pulse radar. Therefore, making the height of the millimeter-wave radar device concealed behind the rearview mirror requires a devised shape or configuration thereof.

The present invention is provided in view of the above problems, in order to present the antenna unit of the radar device to be mounted in the passenger compartment, the antenna unit satisfying the following requirements of: first, performance necessary for a radar as well as the housing sizes; second, configuring the antenna unit of the radar device using as few components as possible in order to reduce the cost of the antenna unit; third, easy enhancement of performances such as the gain.

In order to solve the above problems, the antenna unit according to the present invention is a DBF antenna unit including one or more transmitting antennas and a plurality of receiving antennas arranged at a predetermined interval in a horizontal scanning direction. Each of the transmitting antennas and the receiving antennas includes a waveguide provided with a corner bend and a horn expanding in pyramid-like shape from one end of the waveguide. The other ends of the waveguides of all the transmitting antennas and the receiving antennas are placed on the same plane.

The above arrangement enables the antenna unit to have a substrate to be connected to the horn and a transceiver overlapped and transversely arranged because the waveguides have corner bends and the other ends of the waveguides are positioned on the same plane. Thus, the antenna unit can satisfy the requirements for the performance necessary for a radar and the housing dimensions.

BRIEF DESCRIPTION OF THE DRAWINGS

FIG. 9A is a front view of a composite sensor device integrally incorporated with an image sensor and an antenna unit according to the embodiment.

FIG. 9 B is a side view of the composite sensor device integrally incorporated with the image sensor and the antenna unit according to the embodiment.

DETAILED DESCRIPTION OF THE INVENTION

Embodiment

Figure 1A:
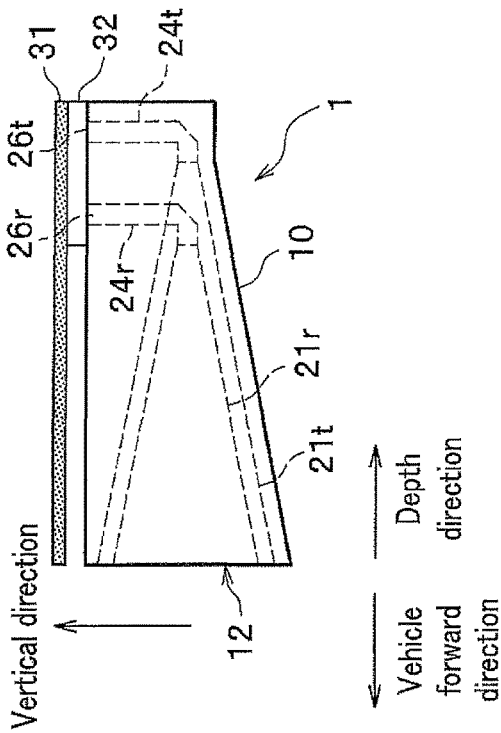
FIG. 1A is a front view of a radar device according to an embodiment.

Hereinafter, embodiments of the present invention will be described in detail with appropriate reference to the drawings.

Each drawing is roughly illustrated only enough for the present invention to be understood. Accordingly, the present invention is not limited to examples presented in the drawings. Some dimensions of elements included in the present invention are exaggerated to clarify explanations. Moreover, the same or common elements are given the same reference symbols in each of the drawings, and duplicated descriptions thereof are omitted.

Configuration of Radar Device According to Embodiment

A configuration of a radar device 1 according to the embodiment is described with reference to FIGS. 1A, 1B, and 1C. The radar device 1 is a millimeter-wave radar device of the DBF architecture. The radar device 1 includes an antenna unit 10, a substrate 31, and a transceiver 32. The radar device 1 is mounted so that an aperture plane 12 of the antenna unit 10 is directed toward the front of the vehicle with a vertical or near-vertical inclination. The following describes a configuration of each element of the radar 1.

<Antenna Unit>

The antenna unit 10 includes a transmitting antenna 20$t$ and a plurality of receiving antennas 20$r$ that are arranged at a predetermined interval in the horizontal plane in the scanning direction. A portion working as an antenna is an inner wall having a predetermined shape and dimensions, and the antenna unit 10 is configured as one conductor block including a hollow structure forming the transmitting antenna 20$t$ and the receiving antennas 20$r$. In the following, as described above, when referring to each part of the transmitting antenna 20$t$ and the receiving antennas 20$r$, "transmission" is represented by the subscript "t" and "receiving" is represented by the subscript "r" respectively, attached to the reference symbol representing each part. However, although the transmitting antennas 20$t$ and the receiving antennas 20$r$ are different in sizes, they have the same functional configurations. Therefore, when the transmitting antennas 20$t$ and the receiving antennas 20$r$ are described without being distinguished, the subscripts attached to the reference symbols thereof are sometimes omitted.

<Antenna>

Figure 2A:
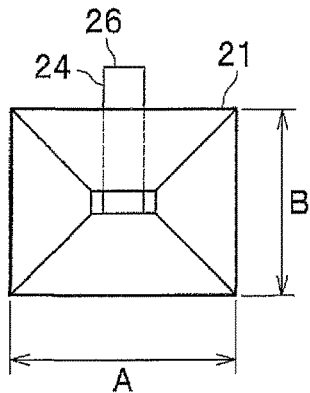
FIG. 2A is a front view of an antenna included in an antenna unit according to the embodiment.
Figure 2B:
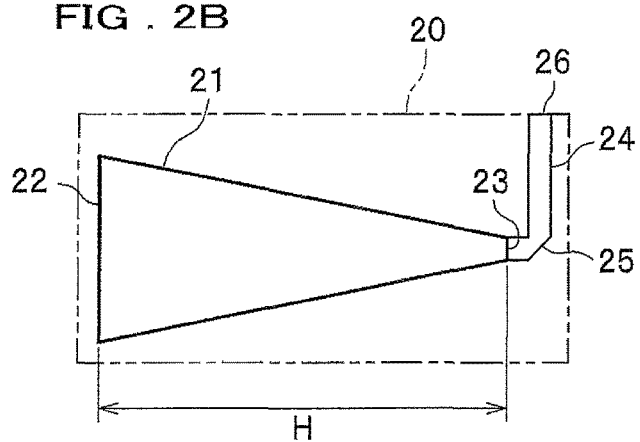
FIG. 2B is a side view of the antenna included in the antenna unit according to the embodiment.

Referring to FIGS. 2A and 2B, configurations of the antenna 20 (transmission antenna 20$t$, receiving antenna 20$r$) are illustrated. The antenna 20 emits electromagnetic wave energy into space and also receives electromagnetic wave energy from space. The antenna 20 is an antenna having an aperture plane, and configured to include a horn 21 and a cross waveguide 24. The antenna 20 may be manufactured by joining the horn 21 and the cross waveguide 24 after separate manufacturing thereof, or the antenna 20 may be integrally manufactured by using, for example, casting or the like. Further, the antenna 20 may be manufactured by plating the inside thereof after resin molding.

The cross waveguide 24 is a metal tube being bent at an approximately right angle and having a hollow inner portion. The cross waveguide 24 is configured so that the cross section thereof is in a rectangle shape configured with short and long sides. Further, the cross waveguide 24 has a substantially right-angled corner bend 25 and an end portion 26 ahead from the corner bend 25 is connected to the transceiver 32 (refer to FIG. 1B). This configuration of the cross waveguide 24 turns the traveling direction of a radio wave at approximately a right angle to connect the transceiver 32 to the horn 21$t$ and 21$r$, and to match a reflection of the radio waves by the corner bend 25.

Figure 1C:
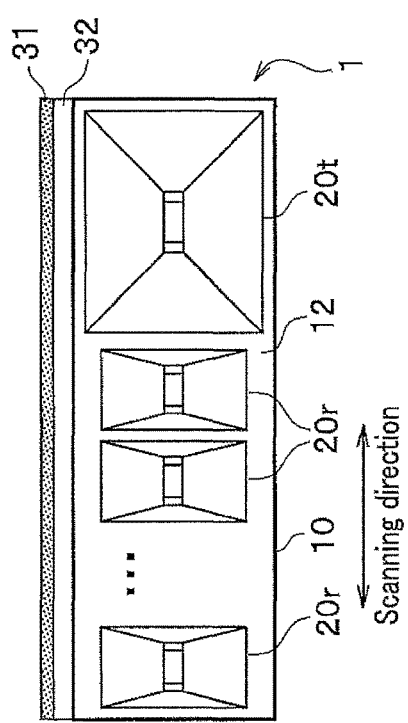
FIG. 1C is a bottom view of the radar device according to the embodiment.
Figure 1B:
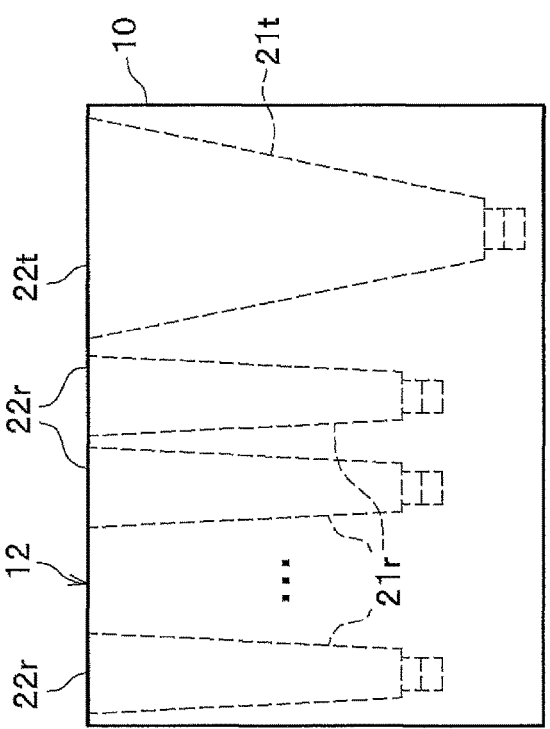
FIG. 1B is a side view of the radar device according to the embodiment.

Here, it is preferable that the end portion 26$t$ of the transmitting antenna 20$t$ and the end portion 26$r$ of the receiving antenna 20$r$ are arranged to be positioned on the same plane (refer to FIG. 1B). This enables overlapping and arranging transversely the substrate 31 to be connected to the horn 21 and the transceiver 32. Therefore, the radar device 1 can be suppressed to a small size in height, and easy to satisfy housing dimension requirements in the vertical direction.

The horn 21 shown in FIGS. 2A and 2B expands wider in a pyramid-like shape from one end of the cross waveguide 24. It means that the horn 21 is formed in a shape of tapering from the aperture portion 22 toward a boundary portion 23 with the cross waveguide 24. Similar to the cross waveguide 24, the horn 21 is formed so that the shape of the cross section thereof is a rectangular having long and short sides. Hereinafter, a dimension of the longer side (width) and a dimension of the shorter side (height) of the aperture 22 of the horn 21, a depth length of the horn 21, are represented respectively by "A", "B", and "H". The horn 21 is also sometimes referred to as a rectangular horn because of the rectangular shape of the aperture portion 22 thereof. Forming the horn 21 in a rectangular shape can make the aperture area at the aperture plane 12 (refer to FIG. 1A) larger than a circular shape.

<Substrate>

The substrate (electronic substrate) 31 shown in FIGS. 1A and 1B is an electronic circuit on the surface of which wiring patterns are drawn using copper foils and a large number of electronic components (the transceiver 32, a digital signal processing unit (not shown), an external interface (not shown), and the like) are disposed. The substrate 31 is shown to be disposed above the antenna unit 10 (horn 21), but may also be disposed below the antenna unit 10 according to designs on mounting or housing.

<Transceiver>

The transceiver 32 shown in FIGS. 1A and 1B is a component which integrates functions such as a voltage controlled oscillator (VCO), an amplifier (AMP), a mixer (MIX) and the like. The transceiver 32 is configured, for example, as a single-chip module. The transceiver 32 is mounted on the substrate 31 as one of the electronic components.

The transceiver 32, when transmitting radio waves, transmits transmission waves modulated in frequency by the VCO to the transmitting antenna 20t. Further, the transceiver 32, when receiving radio waves, receives a received wave from each receiving antenna 20r. The transceiver 32 mixes the transmission wave with each received wave amplified by the AMP, and generates a beat signal corresponding to each frequency difference. Then the transceiver 32 transmits the beat signal generated to a digital signal processing unit (not shown) mounted on the substrate 31. The digital signal processing unit (not shown) calculates a position of an obstacle using the beat signal, and outputs the calculated position of the obstacle to a control computer of the vehicle via an external interface. Here is an end of the description of the structure of the radar device 1 according to the embodiment.

Manufacturing Method of Radar Device According to Embodiment

Next is a description of a method for manufacturing the antenna unit 10 used for the radar device 1 according to the embodiment, with reference to FIGS. 1A, 1B, 1C, 2A, and 2B.

The antenna unit 10 is preferably integrally produced by casting. For example, a mold of the horn 21 is joined to a mold of the cross waveguide 24 at the corner bend 25 and, a metal is poured into the joined molds, each mold is pulled out forward the two sides: the aperture plane 12 (aperture portion 22), and the end portion 26. In particular, the horn 21 has a structure suitable for low-cost and mass production because of the tapered shape easy to pull out the mold, although the horn 21 is long in the depth length H.

Further, the antenna unit 10 does not need to be provided with a separate support member such as an outer frame, because the antenna unit 10 is rigid itself unlike the printed antenna. Further, the antenna unit 10 being cast in aluminum or the like can have an additional function of heat radiation because of a high thermal conductivity and a large volume and a large surface area thereof. Here is the end of the description of the manufacturing process of the radar device 1 according to the embodiment.

Method of Installing Radar Device According to Embodiment

Figure 4:
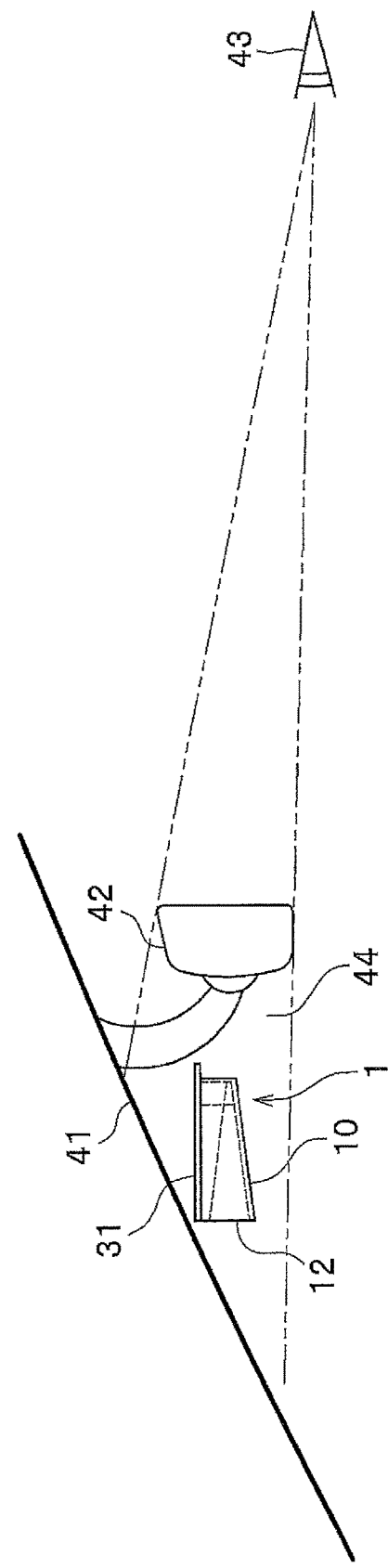
FIG. 4 is a diagram showing a state in which the radar device according to the embodiment is mounted.

Referring to FIG. 4, description is made of how to install the radar device 1 according to the embodiment. FIG. 4 is a side view showing an arrangement configuration for mounting the radar device 1 in the passenger compartment. It should be noted that the actual radar device 1 is incorporated into a housing before mounted on a vehicle, but that here is omitted a description of the housing in order to illustrate a relationship of mounting positions of the substrate 31 and the antenna unit 10. Further, descriptions are omitted of supplementary components such as a member for mounting or the like.

The radar device 1 is preferably mounted in a space region 44 that is a gap between the windshield 41 and the rearview mirror 42 and hidden by the rearview mirror 42 as viewed from an eye position of a driver 43 sitting on a seat. The space region 44 is relatively large in the depth length enough to accommodate the substrate at approximately horizontal inclination. The radar device 1 is mounted so that the aperture plane 12 is vertically or nearly vertically directed toward the front of the vehicle.

Performance Requirements of Antenna for Radar Device According to Embodiment

Figure 5:
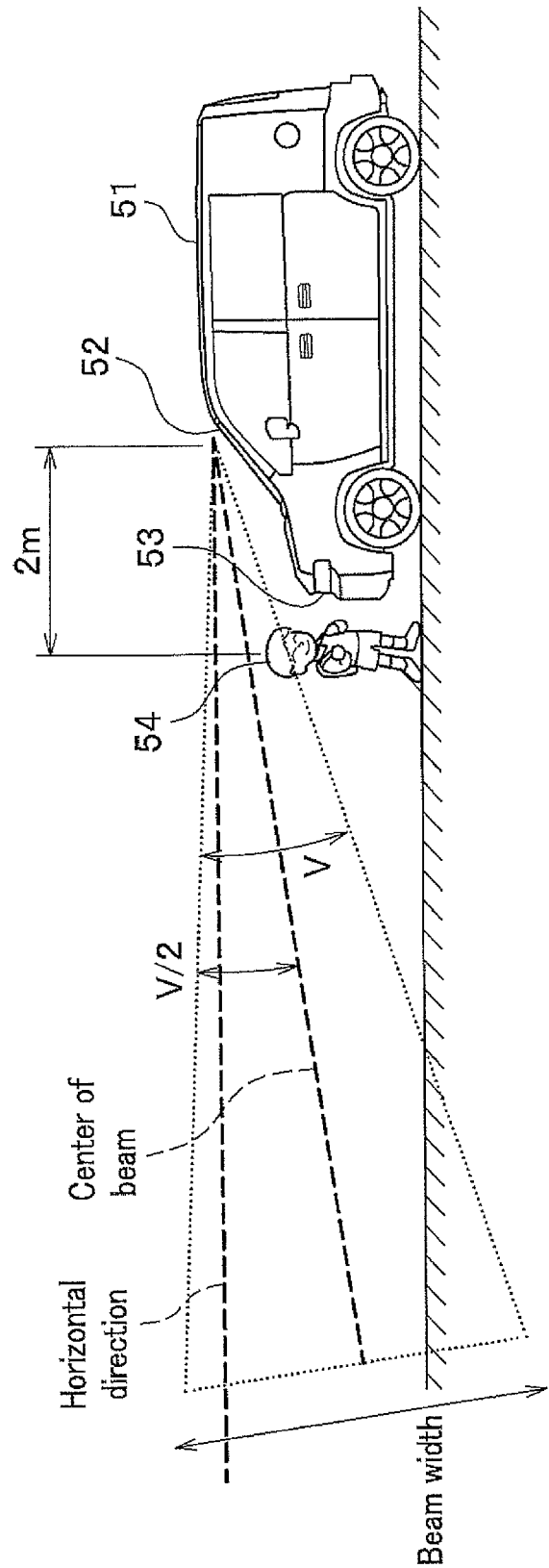
FIG. 5 is a schematic diagram showing an elevation angle detection area of the radar device according to the embodiment.

Referring to FIG. 5, description is made of a performance requirement of the antenna for the radar system 1 according to the embodiment. In the conventional case in which the radar device 1 is mounted in the engine compartment of the vehicle 51, a ground clearance of a conventional mounting position 53 is approximately "0.5 m". Therefore, the radar device 1 can surely detect a child 54 existing immediately in front of the vehicle 51 by emitting a beam only in the horizontal direction. On the other hand, in the case that the radar device 1 is mounted on the space region 44 in the passenger compartment of the vehicle 51 (refer to FIG. 4), the ground clearance of mounting position 52 is approximately "1.5 m". Therefore, the radar device 1 is needed to widen the beam angle downward in order to detect the child 54 existing immediately in front of the vehicle 51.

One of design methods of a radar device 1 is considered to provide the antenna 20 with a beam width corresponding to a necessary range of a detection angle V and to set the center of the beam downward by the angle of V/2. Thereby, the radar device 1 can ensure the viewing angle for the immediate front place of the vehicle 51. For example, in the case that the height of the child 54 is "1.0 m" and the distance from the radar device 1 to the child 54 is "2.0 m", the range of the detection angle of the antenna 20 V is required to be approximately "15°". The following example shows a design example of the antenna unit 10 for the above case.

A directional characteristic in the direction of the elevation angle of the horn 21 is determined by a height B and a depth length H of the aperture 22. This design example is adopted as the dimensions of the transmitting antenna 20t: the height B="3.9λ", the depth length H="20λ"; as the dimensions of the receiving antenna 20r: the height B="2.8λ", and the depth length H="15λ". Here, "λ" is a free-space wavelength at a frequency used, and "λ=3.92 mm" at a frequency "76.5 GHz" used for an in-vehicle radar device. In this design example, the height of the aperture 22 B is "less than 2 cm" and is the dimension enough to conceal the radar device 1 by the rearview mirror.

Figure 6:
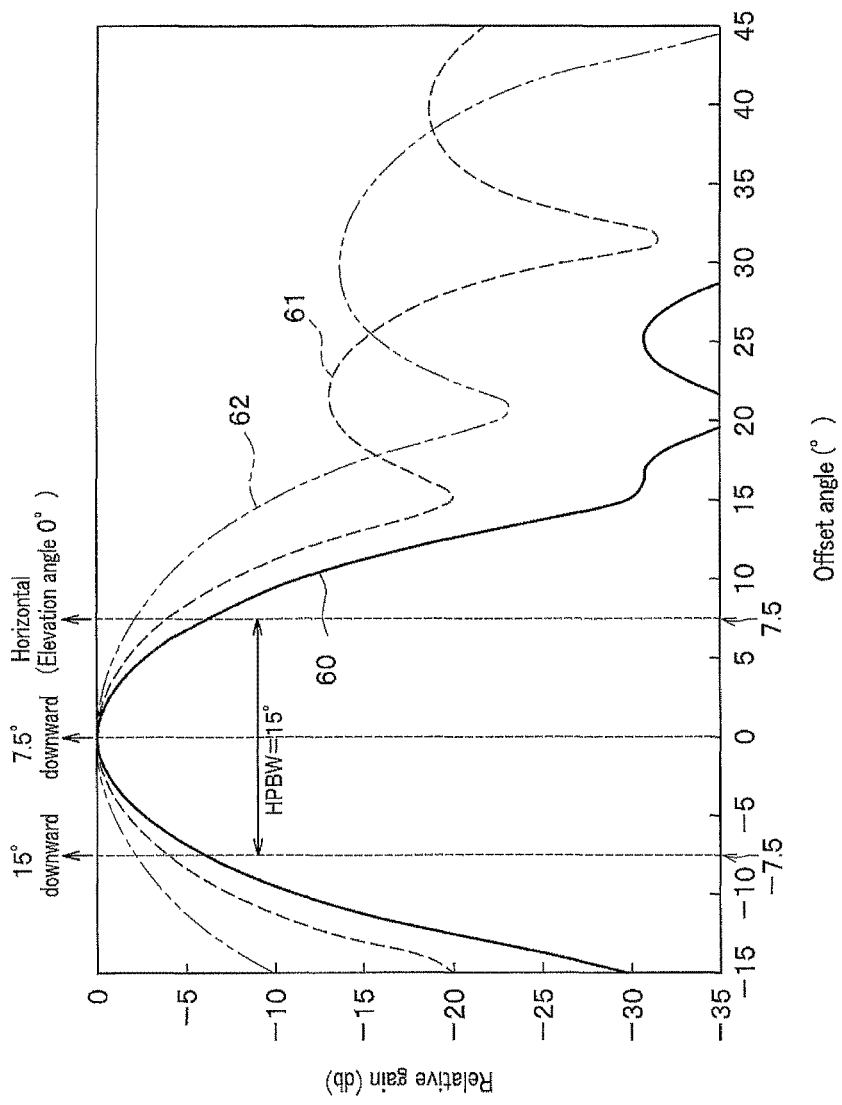
FIG. 6 is a diagram showing a design example of an elevation angle directional characteristic of the antenna used for the radar device according to the embodiment.

FIG. 6 shows the directional characteristic of the elevation angle of the antenna unit 10 in the above design example. The horizontal axis of FIG. 6 represents an offset angle (°) from the center of the beam, the vertical axis represents a relative gain (dB) obtained by normalizing using a peak gain. The broken line 61 in FIG. 6 shows a characteristic of the transmission, the chain line 62 shows a characteristic of the receiving. The solid line 60 is a product of values corresponding to the chain line 62 and the broken line 61, and shows a directional characteristic of an elevation angle as radar. The relative gain of radar directional characteristic 60 is within "½ (−6 dB)" of the peak value in the range of the offset angle from 0° to ±7.5°. This angular range is referred to as Half Power Beam Width (HPBW). If the offset angle comes out of the HPBW, the gain will rapidly decrease. The in-vehicle radar is typically system-designed after determining HPBW in accordance with the detection angle range V required for monitoring. As a similar value to the detection angle range V, HPBW can be regarded as a detectable range. In the design illustrated by FIG. 6, "HPBW=15°," and the HPBW can include the directions from the horizontal direction to the direction downward by 15° from the horizontal direction by installing an antenna 20 so that the center of the beam is directed downward by 7.5° from the horizontal direction (the elevation angle is "0"°), when regarding the upward direction, as the direction in which the offset angle is positive (+) (refer to FIG. 6).

Further, the above design example suppresses the side lobe of the radar characteristic as much as possible by varying the vertical dimension B of the transmitting antenna 20t and the receiving antenna 20r and matching a peak direction of one antenna to a null (a point in which the directivity pattern of the antenna is depressed) of the other antenna in the side lobes of both antennas.

However, there is a problem that the antenna 20 cannot avoid to decrease in the gain by all means, compared with the case of installing the antenna in the engine compartment. As the above description, this problem cannot be avoided because of the requirement to widen the elevation beam width, but high antenna efficiency is still required in order to increase the detection distance as much as possible. The following description explains a method to increase the gain (a method to achieve a high antenna efficiency) even if the height B of the aperture portion 22 is made small. In the following description, explanation is sometimes focused on the vertical polarization, because when the slope of the windshield 41 is large, the vertically polarized wave has smaller attenuation caused by reflection of a glass than the horizontally polarized wave.

Figure 3A:
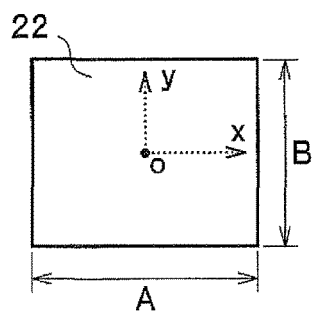
FIG. 3A is a diagram showing a definition of coordinates in an aperture portion.
Figure 3B:
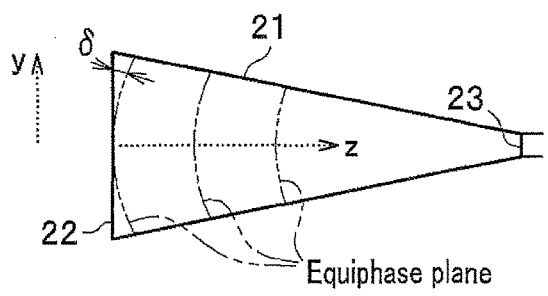
FIG. 3B is a diagram showing a propagation state at a cross section of a rectangular horn.

As shown in FIGS. 3A and 3B, the center of the aperture portion 22 of the horn 21 is defined as the coordinate origin "○", and the horizontal direction, the vertical direction, and the depth direction of the horn 21 respectively as the x-axis, the y-axis, and the z-axis. The rectangular horn transmits radio waves inside the horn 21 in a spherical shape, and makes the equiphase plane in a cross section in the y-axis direction in a circular arc shape as shown in FIG. 3B. This generates the phase difference corresponding to a difference of a propagation path length 5.

A typical pyramid-like horn is provided with an aperture of required dimensions by being gradually widened in the cross-section of the rectangular waveguide, and used only in "TE10 mode" that is a main mode of the rectangular waveguide. For vertical polarization, electrical field distribution in the aperture is given in equations (1-1) and (1-2) as below.

$$Ex=0 \qquad \text{Equation (1-1)}$$

$$Ey(x,y)=\mathcal{E}\cdot\cos(2\pi\cdot x/A)\cdot\exp(j\cdot k\cdot \delta x + j\cdot k\cdot \delta y) \qquad \text{Equation (1-2)}$$

Here, "$\mathcal{E}$" represents an amplitude, the "k" is a wave number ($=2\pi/\lambda$). "$\delta x$" and "$\delta y$" are differences between the propagation path lengths in the x and y directions, and approximately $\delta x = x^2/2H$, and $\delta y = y^2/2H$.

The aperture gain G (dBi) of the horn 21 is given in the following equations (2-1) and (2-2):

$$Ga = 10 \cdot \log\{(4\pi AB/\lambda^2)\cdot \eta a\} \qquad \text{Equation (2-1)}$$

$$\eta a = \eta x \cdot \eta y \qquad \text{Equation (2-2)}$$

Here, "$\eta a$" is aperture efficiency, "$\eta x$" and "$\eta y$" are efficiency by the electric field distribution in the x- and y-direction. When an electric field is distributed in an equi-intensity and an equiphase in the whole area of the aperture, the gain in the area will be theoretically the maximum. Taking this case as a standard (100%), the aperture efficiency $\eta a$ represents a reduction ratio of the gain due to an actual electric field distribution in the aperture.

In the electric field distribution in "TE10 mode" of the equation (1-2), the maximum efficiencies of the pyramid-like horn; $\eta x=81\%$, $\eta y=100\%$ are obtained if $\delta x=0$, $\delta y=0$ ideally. As the depth length H increases, $\delta x$ and $\delta y$ become smaller and closer to "0" ideally, if the aperture width does not change.

Further, as a means for increasing the gain, a stepped horn is known (for example, refer to FIGS. 3-4 or the like in the Patent Document 1). The horn 21a shown in FIG. 3D of the present application is an example of a stepped horn structure. The horn 21a is provided with a step portion (step structure) 27 at a boundary portion 23 with the cross waveguide 24. This makes the horn 21a generate "TE30 mode", one of higher-order modes.

The long side width of the cross waveguide 24 is selected as less than 1λ for transmitting only the TE10 mode. In contrast, for the dimension requirement of the step portion 27, the width F of the step portion 27 is theoretically required to be 1.5λ or more to allow the "TE30 mode", but the tapered shape allow the "TE30 mode" to be generated at the width somewhat longer than 1.4λ that is rather less than this 1.5λ.

Figure 3C:
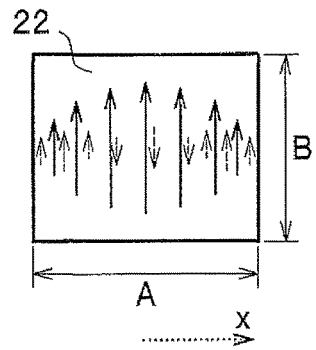
FIG. 3C is a schematic diagram showing a distribution state of a mode component at the aperture portion of a stepped horn.

FIG. 3C schematically shows the electric field distribution at the aperture portion 22 of the horn 21a, in which solid arrows indicate the directions of the electric field of TE10 components, and dashed arrows indicate those of the TE30 components. As shown in the figure, if each dimension is selected so that the direction of the electric field of components of both modes is reversed at the center of the aperture portion 22, and that the amplitude ratio of TE10 and TE30 components is 3:1, $\eta x$ that is the aperture efficiency in the x direction at the stepped horn 21a can be achieved up to 90%.

Figure 3D:
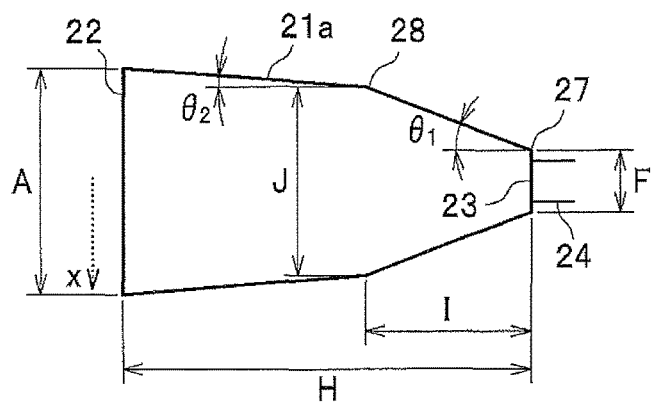
FIG. 3D is a horizontal sectional view showing an example of a stepped horn.

Additionally, the horn 21a shown in FIG. 3D is provided with a taper changing portion 28. The taper changing portion 28 is a boundary of two different flare angles, and the flare angle θ at the front of the taper changing portion 28 differs from that at the rear thereof. That is, the horn 21a is widened at a first angle $\theta_1$ from the cross waveguide 24, and is widened in a second angle $\theta_2$ smaller than the first angle $\theta_1$ from the taper changing portion 28. The taper changing portion 28 is formed at a distance I from the boundary portion (the horn bottom plane) 23, and its lateral dimensions (width) is referred as "J".

If the taper changing portion 28 is not provided, that is, if the taper is made uniform from the boundary portion 23 to the aperture portion 22, in order to place the phase relationship of TE10 and TE30 components into the state shown in FIG. 3C (the state in which the direction of the electric field is reverse at the center of the aperture), it is necessary to adjust the phase difference between the two modes by selecting the depth length H. On the other hand, in the structure which is provided with a taper changing portion 28, the phase can be adjusted according to the distance I and the width J, under arbitrary selection of the depth length H. It can be said that because the selection of the depth length H is one of the important issues in the design according to the present invention, the structure provided with the taper changing portion 28 is useful in the advantage that the depth length H is able to be arbitrarily selected. Note that only the taper changing portion 28 can generate and adjust the higher order mode without the step portion 27.

On the other hand, the aperture efficiency ηy in the y-direction is almost determined by the dimensions of the height B and the depth length H. Assuming that β=B²/λH, the aperture efficiency ηy is "99%" if "β=0.5", and "97%" if "β=0.8".

Note that the antenna gain in operation should be evaluated under consideration of the waveguide loss, and that an operation gain Gw (dBi) and an operation efficiency ηw (dBi) shown in the following equations (3-1) and (3-2) is used as an index:

$$Gw = Ga - L \quad \text{Equation (3-1)}$$

$$\eta w = \eta a \cdot \exp 10(-L/10) \quad \text{Equation (3-2)}$$

Here, "L" is the waveguide loss of the antenna system.

The present invention requires consideration of the transmission loss of the horn 21a itself because of the long depth length H. The amount of the loss is calculated by the following equation (4), assuming the waveguide as a tapered waveguide which has the cross-sectional dimension gradually increasing.

$$L = \int_{-H}^{0} \alpha(z) dz \quad \text{Equation (4)}$$

α in the equation (4) is represented using the following equations (5-1) and (5-2).

$$\alpha = \alpha o \cdot Ke \quad \text{Equation (5-1)}$$

$$\alpha o = 0.792 \cdot \{1 + (Wy \cdot \lambda^2 / 2Wx^3)\} / \{Wy \cdot \sqrt{(\lambda \sigma \cdot [1 - \lambda^2 / 4Wx^2])}\} \quad \text{Equation (5-2)}$$

Here, "Wx" is a horizontal dimension of the horn inner wall in the z-direction vertical cross section; "Wy", a vertical dimension, "σ", a conductivity of the inner wall surface; "αo", a theoretical value of an attenuation constant (loss per unit length) in a rectangular waveguide of a horizontal dimension Wx and a vertical dimension Wy. The horizontal dimension Wx and the vertical dimension Wy are determined according to the taper (flare angle θ) of the inner wall of the horn and the distance z in the depth direction. For example, if a taper in the vertical (y) direction θy is constant, the vertical dimension Wy can be obtained as Wy=B−2z·tan(θy). In the high frequency range such as the millimeter-wave band, larger attenuation appears than in the ideally smooth surface according to the roughness of the inner wall surface, and "Ke" is a multiplier introduced in expectation of the above influence.

If the lateral dimension Wx increases to some extent (Wx>λ), α is approximately determined only by Wy, as shown in the Equation (6).

$$\alpha o \approx 0.792 / \{Wy \cdot \sqrt{(\lambda \sigma)}\} \quad \text{Equation (6)}$$

The following shows the calculated values in a supposition in which the frequency is 76.5 GHz and the inner wall is made of aluminum. Here, the calculation is performed assuming "Ke=3". For example, when the waveguide has dimensions: "Wx=0.8Δ" and "Wy=0.4Δ" that are dimensions of a typical waveguide, "α=0.1 (dB/cm)" approximately. In the horn, attenuation decreases as the size of the inner wall cross section increases. Since the present invention uses a stepped structure, "α=0.05 (dB/cm)" at the boundary portion (bottom plane of the horn) when assuming "Wx=1.4Δ" and "Wy=0.4λ"; α is approximately inversely proportional to Wy according to the equation (6) at the tapered portion.

For a stepped horn, here is described a calculation of the efficiency of the design example shown in FIG. 6. In the transmission (B=3.9λ, H=20λ), ηa=88%, L=0.12 dB, ηw=85.6% is obtained; in the receiving (B=2.8λ, H=15λ), ηa=89%, L=0.1 dB, ηw=87%. Consequently, only using the horn 21 having a uniform taper as a radiator is advantageous in aspects of efficiency and loss compared to other methods, and using a stepped horn 21a enables to obtain a very high efficiency by improving the aperture efficiency and further reducing the transmission loss.

Comparing Radar Devices According to the Conventional Art and the Embodiment

Figure 7A:
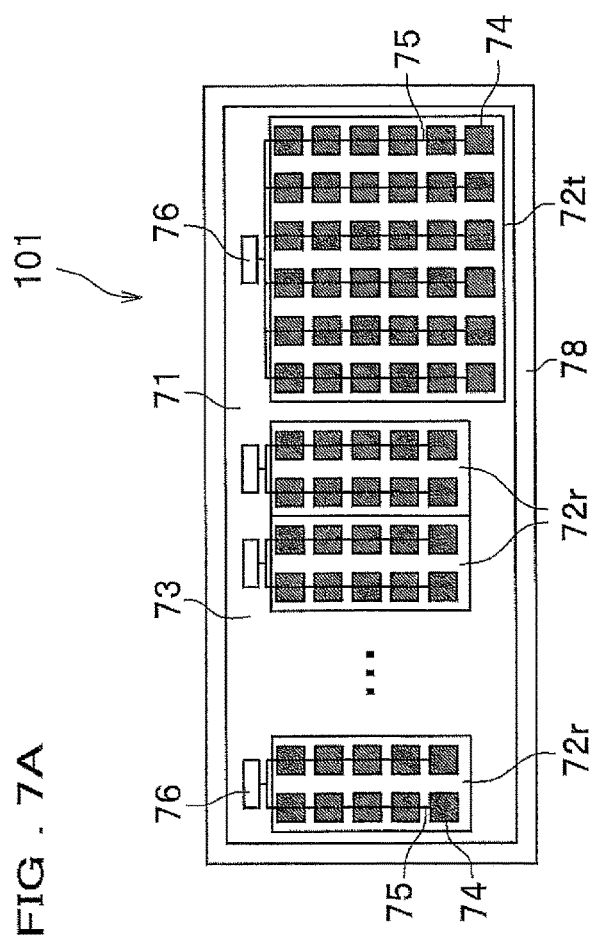
FIG. 7A is a front view of a radar device as a conventional example.
Figure 7B:
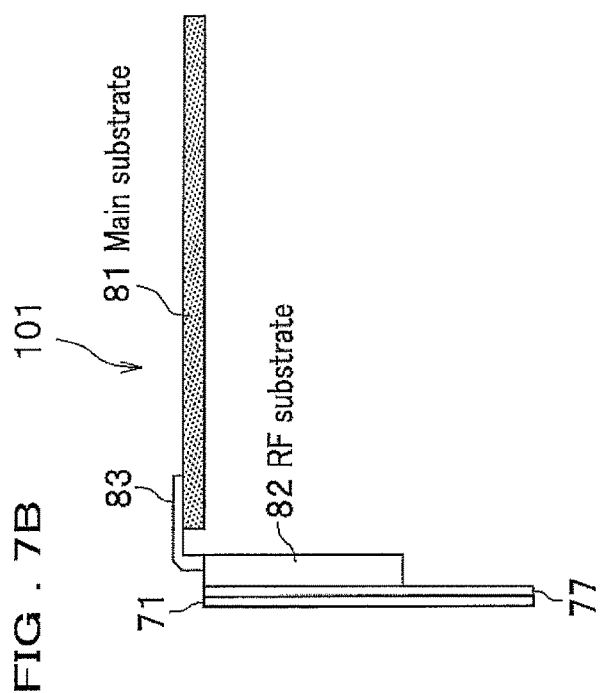
FIG. 7B is a side view of the radar device as the conventional example.

FIGS. 7A and 7B show a conventional radar device 101 using a flat type of array antenna 71 (microstrip array antenna) as a comparative example. The radar device 101 is supposed to be mounted in the space region 44 shown in FIG. 4, and configured to be provided with a printed antenna 71, a ground plate 77, a main substrate 81, an RF substrate 82, and a harness 83. That is, because the height of the radar device is limited to a range of being concealed by the rearview mirror 42 (refer to FIG. 4), the substrate is divided into the RF substrate 82 implementing the millimeter-wave transceiver and the main substrate 81 including circuits other than the transceiver. The main substrate 81 is arranged transversely, and the RF substrate 82 vertically (refer to FIGS. 9 and 10 of the Publication No. WO2006/035510).

The printed antenna 71 is provided with necessary elements such as radiating elements 74, power feed lines 75, and power feed terminals 76 on an antenna substrate 73 by conductor-printing, and a transmitting antenna 72t and receiving antennas 72r are formed thereon. The antenna 71 is provided with a ground plate 77 on the back side of the printed surface, and overlapped and joined to the RF substrate 82 together with the ground plate 77.

The antenna substrate 73 is made of a thin dielectric sheet, and is often made more rigid in order to prevent deformation caused by assembly or heating by providing the outer frame 78 shown in FIG. 7A on the printed antenna 71. Further, the printed antenna 71 is required to be provided with the power feed terminals 76 and power feed lines 75 within the same plane. Therefore, the printed antenna 71 has an actual front area wider than the area functioning for radiation. In contrast, the antenna unit 10 using the horn 21 shown in FIG. 1A or the like can have an actual front area approximately equal to the area of the radiation aperture. That is, the antenna unit 10 has a structure that can easily make the actual area of the front as viewed from the aperture portion 22 smaller than the conventional device.

Further, because the radiating element 74, the power feed lines 75, and the like have fine shapes formed by printing thin metal foils such as copper, oxidation or rusting could largely degrade their performance, although the radar device 101 is placed in the passenger compartment. Therefore, since the radar device 101 requires measures such as being configured to include a radome or being coated by fusing a dielectric film for protection thereto, the radar device 101 is difficult to avoid the higher price. In contrast, the antenna unit 10 using the horn 21 shown in FIG. 1A and the like can be applied with the same anticorrosion treatment as the general metallic member. For example, the antenna unit 10 can be treated with standard and inexpensive measures such as generating a protective coating by immersing the whole of the antenna unit 10 in a chemical treatment solution. Therefore, using the antenna unit 10 enables to make a radome or the like unnecessary and to suppress the price from increasing.

Additionally, the radar device 101 using the printed antenna 71 is needed to have the substrate divided into two substrates, and to include a harness 83 for coupling these two substrates 81 and 82. Therefore, the radar system. 101 is more expensive in member cost and more in assembly hours. In contrast, in the radar device 1 using the antenna unit 10 shown in FIG. 1A or the like, the cross waveguides 24 have the corner bends 25, therefore the substrate 31 and the transceiver 32 can be overlapped and arranged transversely, and no parts are required for connecting the substrate 31 and the transceiver 32. Therefore, using the antenna unit 10 enables the material cost to be kept low and also assembly hours to be reduced.

Further, since the printed antenna 71 distributes power to each radiating element 74 arranged in a wide area, this results in the losses in the power feed lines 75 (supply losses). The printed antenna 71 has generally large power supply loss because the printed antenna 71 uses, for example, conductive lines such as strip lines for the power feed lines 75. Specifically, the Non-Patent Document 1 reports "ηw=45%" as quite high operating efficiency of the printed antenna. Meanwhile, the waveguide slot array antenna shown in the Patent Document 1 uses the waveguides for the power feed lines, therefore, it is presumed that the power supply loss is relatively small, and that the operating efficiency can reach a level of approximately "ηw=70%". In contrast, in the design example of FIG. 6, the operation efficiency can reach up to "ηw=85.6%" in transmission; "ηw=87%" in receiving, and is much higher than those of the conventional arts.

As mentioned above, the radar device 1 according to the embodiment can have the substrate 31 arranged approximately horizontally, and the aperture plane 12 of the antenna unit 10 arranged in the direction approximately perpendicular the substrate 31. Accordingly, the radar device 1 according to the embodiment can be housed within the dimensions of the space region 44 concealed behind the rearview mirror 42, therefore, the radar device 1 can be mounted in the vehicle compartment without obstructing the driver's view.

Further, the radar device 1 according to the embodiment can ensure a detection area with no blind spots, from far away in the horizontal direction to immediately before the vehicle in the downward direction by increasing the beam width in the elevation angle direction. Accordingly, the radar device 1 according to the embodiment can achieve the maximum gain in a limited aperture area by using the horn 21 of low loss and high efficiency for a radiator, although the antenna 20 needs to be reduced in height.

Additionally, the radar device 1 according to the embodiment has a structure that has the antenna unit 10 of all the required functions and performances with minimal number of elements and that is integrally moldable and suitable for low-cost mass production. Accordingly, the radar device 1 according to the embodiment can be achieved in low cost with the minimum number of parts.

Modification Examples

The foregoing describes the embodiments of the present invention, but the present invention is not limited thereto, and may be carried out within a range not changing the spirit and scope of the appended claims. Modification examples of the embodiment are described below.

Figure 8:
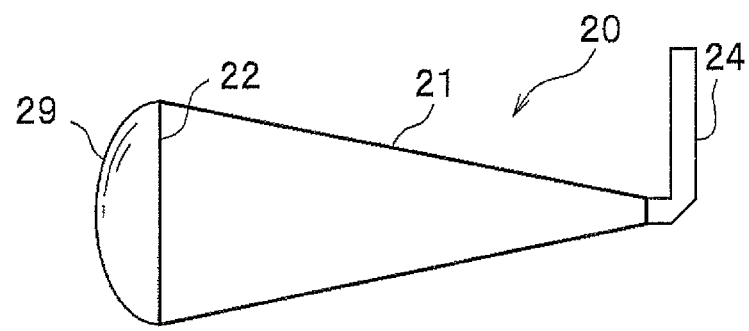
FIG. 8 is a diagram for explaining an antenna according to a modification (the antenna provided with a lens at the aperture portion of the horn).

FIG. 8 shows an antenna 20 that is obtained by mounting a lens 29 at the aperture portion 22 of the horn 21 shown in FIGS. 2A and 2B. The lens 29 should only be a convex lens of which a central portion is thicker than an edge portion and able to be formed using various shapes. This enables the aperture efficiency ηa to be improved. Therefore, for example, in the case in which the depth length H cannot be sufficiently secured due to design restrictions or the like, δx and δy become larger and the aperture efficiency decreases, but attaching the lens 29 can compensate this decrease.

FIG. 9A is a front view of a sensor composite device in which a radar device is incorporated integrally with an image sensor, and FIG. 9B is a view of an internal structure of the sensor composite device as viewed from the side.

The composite sensor device 9 is a device of composite sensors in which the antenna unit 10 as a first sensor and an image sensor 91 as a second sensor are integrated in a housing (frame) 94. The composite sensor device 9 is configured to include the antenna unit 10, the image sensor 91, and a composite substrate 93. Here, the antenna unit 10 and the millimeter-wave transceiver 32 are the same as that shown in FIG. 1A and the like. It should be noted that the chain line shows the outer shape of the housing (frame) 94.

The image sensor 91 includes a camera 92 to take an image in front of a vehicle.

The composite substrate 93 is arranged transversely like the radar device 1 shown in FIG. 1A or the like, and provided with the transceiver 32 and the image sensor 91 including the camera 92. The transceiver 32 and the image sensor 91 each is mounted preferably on each of the opposing faces of the substrate 93, to avoid mutual interference (for example, rising up of a noise level in the transceiver 32 due to electromagnetic waves generated by the image sensor 91). This gives an effect of isolating each element of the composite substrate 93.

In the space region 44 (refer to FIG. 4) in which the composite sensor device 9 is mounted, the upper portion is smaller in depth. Accordingly, a suitable structure is that in which the image sensor 92 that is smaller both in width and depth compared to the antenna unit 10 is arranged at the upper part of the housing (frame) 94, and that in which the antenna unit 10 is arranged at the lower part of the housing (frame) 94.

Further, this structure enables both sensors to be smaller in width, rather than a side-by-side arrangement of the both sensors 10 and 91. Reduction of the width is further desirable because the region 44 is also considered that a communication device, an antenna, or the like of the other external sensors or the other system other than the composite sensor device 9 may be mounted.

The radar device 1 and the composite sensor device 9 may be formed integrally with the rearview mirror 42. In that case, the need to mount the device 1 and 9 can be eliminated.

The present invention enables the antenna unit for the radar device mounted in the passenger compartment: first, to satisfy the performance requirements necessary for a radar as well as the dimension requirements for housing; second, to be constructed by the minimum number of components in order to reduce the device cost; third, to increase the performance such as the gain as easily as possible, adding to the first and second achievements.

EXPLANATION OF THE REFERENCE CHARACTER

1: radar device
10: antenna unit

12: aperture plane
20, 20t, 20r: antenna
21, 21a, 21t, 21r: horn
22: aperture portion
23: boundary portion (horn bottom)
24, 24t, 24r: cross waveguide (waveguide)
25: corner bend
26, 26t, 26r: end portion
27: step portion
28: taper changing portion
29: lens
31: substrate
32: transceiver
41: windshield
42: rearview mirror
43: eye position of a driver
44: space region
9: composite sensor device
91: image sensor
94: housing (frame)

We claim:

1. A radar device comprising:
at least one transmitting antenna transmitting radio waves and a plurality of receiving antennas receiving radio waves; and
a substrate including a transceiver outputting radio waves to the transmitting antenna and receiving the radio waves from the plurality of receiving antennas; wherein
each of the transmitting antenna and the plurality of receiving antennas includes a horn being rectangular in cross-section and a waveguide being rectangular in cross-section respectively;
the transmitting antenna and the plurality of receiving antennas open toward a first direction;
the transmitting antenna and the plurality of receiving antennas are arranged in a second direction perpendicular to the first direction;
an inner surface of the waveguide has a first side face and a second side face, the first side face being longer than the second side face;
the waveguide has a corner bend where the first side face is bent;
one end of the waveguide is connected to the horn and another end of the waveguide couples to the transceiver; and
at least part of the horn overlaps with the substrate when the horn is viewed in a third direction perpendicular to the first and the second direction.

2. The radar device according to claim 1, wherein
the at least one of the transmitting antenna or the plurality of the receiving antennas has a step structure expanding to the second direction at a boundary portion between the horn and the waveguide; and
a width of the step structure in the second direction is about 1.4 times or more than a wavelength of the radio waves.

3. The radar device according to claim 2, wherein
an inner surface of the horn has a first taper portion forming a first angle with the horn axis and a second taper portion forming a second angle with the horn axis smaller than the first angle.

4. The radar device according to claim 3, wherein
a bend angle of the first side face at the corner bend is substantially 90°.

5. The radar device according to claim 4, wherein
the transmitting antenna and the plurality of the receiving antennas are produced by casting, or integrally molded by resin molding, and thereafter plated.

6. The radar device according to claim 3, wherein
the transmitting antenna and the plurality of the receiving antennas are produced by casting, or integrally molded by resin molding, and thereafter plated.

7. The radar device according to claim 2, wherein
a bend angle of the first side face at the corner bend is substantially 90°.

8. The radar device according to claim 7, wherein
the transmitting antenna and the plurality of the receiving antennas are produced by casting, or integrally molded by resin molding, and thereafter plated.

9. The radar device according to claim 2, wherein
the transmitting antenna and the plurality of the receiving antennas are produced by casting, or integrally molded by resin molding, and thereafter plated.

10. The radar device according to claim 2, wherein
at least one of the transmitting antennas and the plurality of the receiving antennas has a lens mounted on an aperture portion of the horn.

11. The radar device according to claim 2; wherein
the radar device is included in a composite sensor device with an image sensor including a camera; and
the image sensor is arranged above the substrate.

12. The radar device according to claim 1, wherein
an inner surface of the horn has a first taper portion forming a first angle with the horn axis and a second taper portion forming a second angle with the horn axis smaller than the first angle.

13. The radar device according to claim 12, wherein
a bend angle of the first side face at the corner bend is substantially 90°.

14. The radar device according to claim 12, wherein
the transmitting antenna and the plurality of the receiving antennas are produced by casting, or integrally molded by resin molding, and thereafter plated.

15. The radar device according to claim 1, wherein
a bend angle of the first side face at the corner bend is substantially 90°.

16. The radar device according to claim 15, wherein
the transmitting antenna and the plurality of the receiving antennas are produced by casting, or integrally molded by resin molding, and thereafter plated.

17. The radar device according to claim 15; wherein
the radar device is included in a composite sensor device with an image sensor including a camera; and
the image sensor is arranged above the substrate.

18. The radar device according to claim 1, wherein
the transmitting antenna and the plurality of the receiving antennas are produced by casting, or integrally molded by resin molding, and thereafter plated.

19. The radar device according to claim 1, wherein
at least one of the transmitting antennas and the plurality of the receiving antennas has a lens mounted on an aperture portion of the horn.

20. The radar device according to claim 1; wherein
the radar device is included in a composite sensor device with an image sensor including a camera; and
the image sensor is arranged above the substrate.

* * * * *